(12) United States Patent
Degenkolb et al.

(10) Patent No.: US 7,962,470 B2
(45) Date of Patent: Jun. 14, 2011

(54) SYSTEM AND METHOD FOR SEARCHING WEB SERVICES

(75) Inventors: Marko Degenkolb, Wiesloch (DE); Ralf Halbedel, Heidelberg (DE); Martin Zurmuehl, Muehlhausen (DE)

(73) Assignee: SAP AG, Walldorf (DE)

( * ) Notice: Subject to any disclaimer, the term of this patent is extended or adjusted under 35 U.S.C. 154(b) by 260 days.

(21) Appl. No.: 11/445,431

(22) Filed: Jun. 1, 2006

(65) Prior Publication Data

US 2007/0282879 A1 Dec. 6, 2007

(51) Int. Cl.
*G06F 7/00* (2006.01)
*G06F 17/30* (2006.01)
*G06F 15/16* (2006.01)

(52) U.S. Cl. .................. 707/709; 709/245; 709/229

(58) Field of Classification Search .............. 707/10, 707/101
See application file for complete search history.

(56) References Cited

U.S. PATENT DOCUMENTS

| | | | |
|---|---|---|---|
| 7,016,892 B1 | 3/2006 | Kokkonen et al. | |
| 7,050,056 B2 | 5/2006 | Meyringer | |
| 2002/0161745 A1* | 10/2002 | Call | 707/1 |
| 2003/0204428 A1 | 10/2003 | Botscheck et al. | |
| 2003/0204429 A1 | 10/2003 | Botscheck et al. | |
| 2003/0204432 A1 | 10/2003 | Botscheck et al. | |
| 2003/0204433 A1 | 10/2003 | Botscheck et al. | |
| 2003/0233365 A1* | 12/2003 | Schmit et al. | 707/100 |
| 2004/0059723 A1 | 3/2004 | Hasegawa et al. | |
| 2004/0064554 A1* | 4/2004 | Kuno et al. | 709/225 |
| 2004/0122926 A1 | 6/2004 | Moore et al. | |
| 2004/0133580 A1* | 7/2004 | Liu et al. | 707/100 |
| 2004/0215621 A1* | 10/2004 | Harvey et al. | 707/10 |
| 2004/0225660 A1* | 11/2004 | Carey et al. | 707/10 |
| 2005/0050015 A1 | 3/2005 | Becker et al. | |
| 2005/0055372 A1* | 3/2005 | Springer et al. | 707/104.1 |
| 2005/0094176 A1* | 5/2005 | Matsuishi | 358/1.13 |
| 2005/0154785 A1 | 7/2005 | Reed et al. | |
| 2005/0165754 A1 | 7/2005 | Valliappan et al. | |
| 2005/0256892 A1* | 11/2005 | Harken | 707/101 |
| 2005/0283539 A1* | 12/2005 | Betts et al. | 709/245 |
| 2006/0004722 A1* | 1/2006 | Betts et al. | 707/3 |
| 2006/0004764 A1* | 1/2006 | Kurhekar et al. | 707/10 |
| 2006/0015722 A1 | 1/2006 | Rowan et al. | |
| 2006/0015843 A1 | 1/2006 | Sabbouh | |
| 2006/0026123 A1 | 2/2006 | Moore et al. | |
| 2006/0026141 A1* | 2/2006 | Brubacher et al. | 707/3 |
| 2006/0053040 A1 | 3/2006 | Zurmuehl | |
| 2006/0053381 A1 | 3/2006 | Degenkolb et al. | |
| 2007/0168947 A1 | 7/2007 | Halbedel et al. | |

(Continued)

OTHER PUBLICATIONS

Farnoush Banaei-Kashani; Web Services Peer to Peer Discovery Service;2004; pp. 1-7.*

(Continued)

*Primary Examiner* — Neveen Abel-Jalil
*Assistant Examiner* — Jermaine Mincey
(74) *Attorney, Agent, or Firm* — Fish & Richardson P.C.

(57) ABSTRACT

Generally, systems and methods for managing and searching web services are provided. Example software comprises computer readable instructions operable to receive a query from a first client for one or more requested web services via a graphical user interface. The software then identifies at least one web service stored in a Universal Description, Discovery, and Integration (UDDI) registry based on the query and an index of web service metadata. Information associated with the one or more identified web services is then presented via the graphical user interface.

23 Claims, 6 Drawing Sheets

U.S. PATENT DOCUMENTS

2007/0250304 A1 10/2007 Elfner et al.
2009/0006402 A1 1/2009 Bohle et al.
2009/0006539 A1 1/2009 Degenkolb et al.

OTHER PUBLICATIONS

Boubez et al., "*UDDI Data Structure Reference V1.0,*" Jun. 28, 2002, pp. 1-32, obtained from http://uddi.org/pubs/DataStructure-V1.00-Published-20020628.pdf.

Boubez et al., "*UDDI Programmer's API 1.0,*" Jun. 28, 2002, pp. 1-68, obtained from http://uddi.org/pubs/ProgrammersAPI-V1.01-Published-20020628.pdf.

"*UDDI Core tModels, Taxonomy and Identifier Systems,*" Aug. 23, 2001, 12 pages, obtained from http://uddi.org/taxonomies/Core_Taxonomy_OverviewDoc.htm.

"*Using WSDL in a UDDI Registry, Version 1.08,*" UDDI Spec TC, Oasis, 2001-2002, pp. 1-11, obtained from http://www.oasis-open.orgcommittees/uddi-spec/doc/bp/uddi-spec-tc-bp-using-sdl-v108-20021110.htm.

The Stencil Group, Inc., "*The Evolution of UDDI, UDDI.org White Paper,*" Jul. 19, 2002, pp. 1-15, obtained from http://uddi.org/pubs/the_evolution_of_uddi_20020719.pdf.

Oasis, UDDI Spec TC, "*Using WSDL in a UDDI Registry, Version 2.0.2—Technical Note,*" Jun. 31, 2004, pp. 1-43, obtained from http://www.oasis-open.org/committees/uddi-spec/doc/tn/uddi-spec-tc-tn-wsdl-v202-20040631.pdf.

Oasis, UDDI Spec TC, "*UDDI Version 3.0.2, UDDI Spec Technical Committee Draft,*" Oct. 19, 2004, pp. 1-361, obtained from http://uddi.org/pubs/uddi_v3.htm.

Paolucci, M. et al.; "Semantic Matching of Web Services Capabilities"; The Semantic Web—ISWC 2002 First International Semantic Web Conference Proceedings; Jun. 9-12, 2002; pp. 333-347.

Shaikhali, A. et al.; "UDDIE: An Extended Registry for Web Services"; Applications and the Internet Workshops, 2003 Proceedings; Jan. 27-31, 2007; pp. 85-89.

Extended European Search Report issued in European Application No. 07109355.3 issued on Oct. 31, 2007; 7 pages.

Communication Pursuant to Art. 94(3) EPC issued in European Application No. 07109355.3 on Aug. 21, 2008; 1 page.

\* cited by examiner

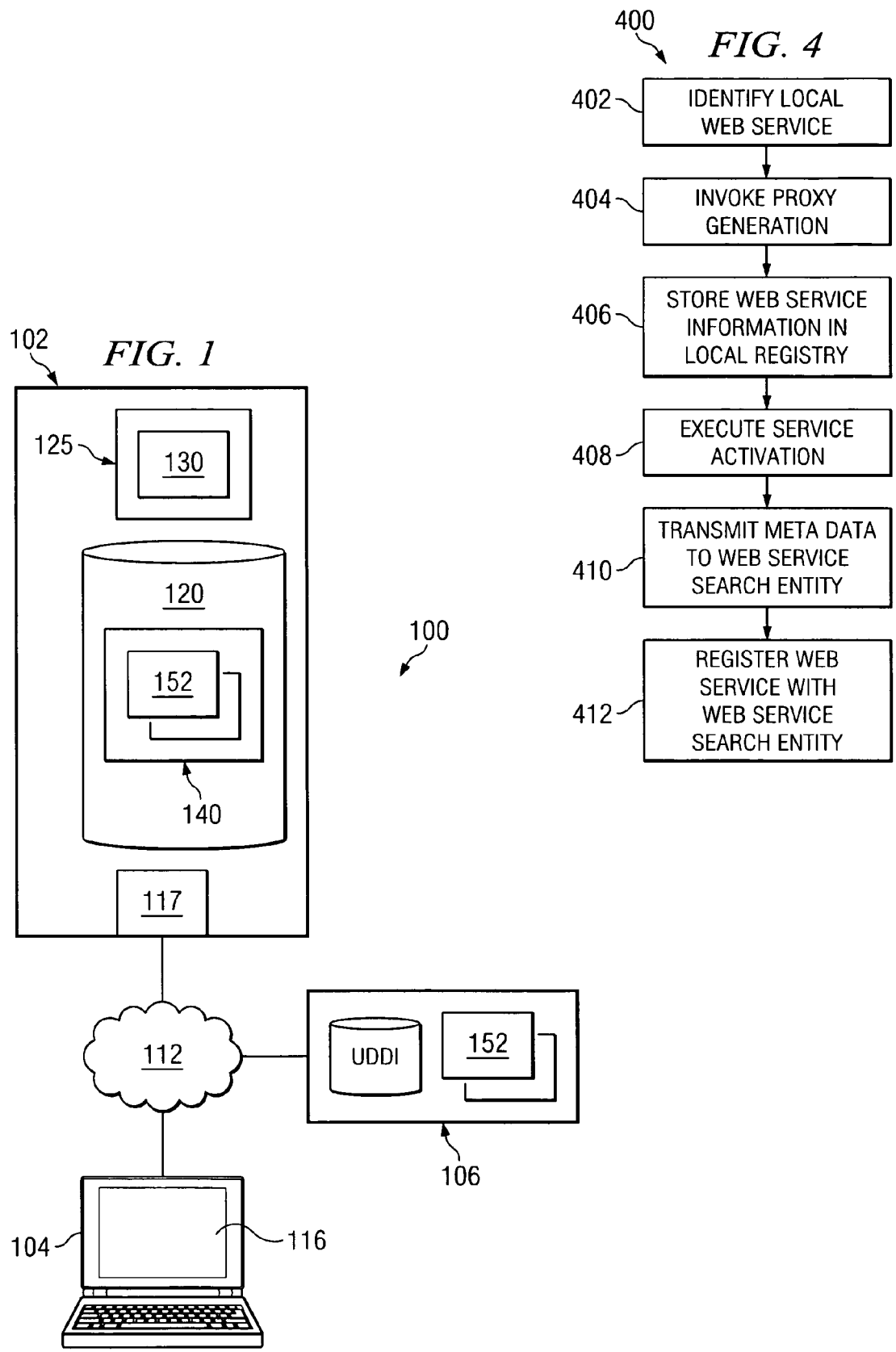

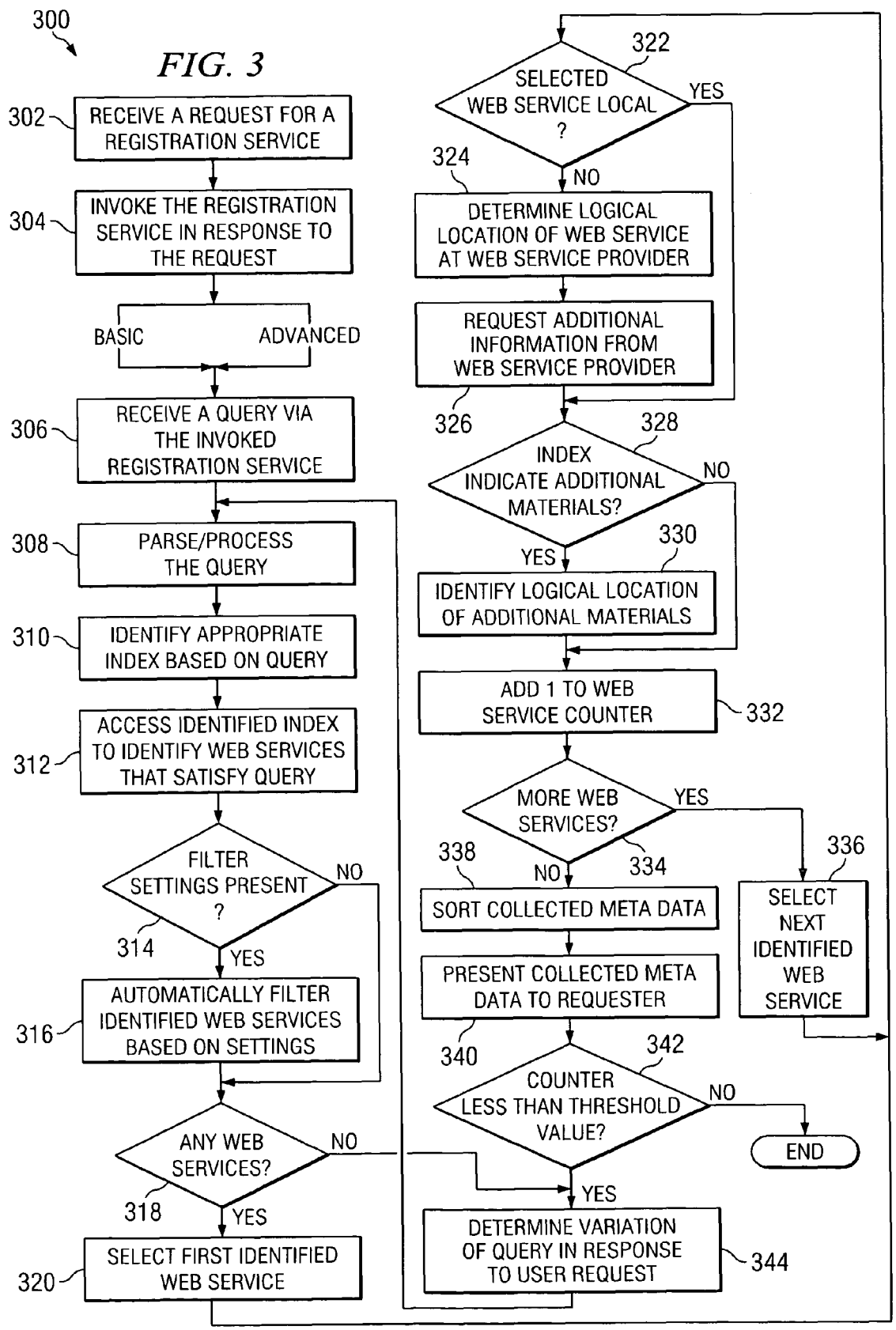

SYSTEM AND METHOD FOR SEARCHING WEB SERVICES

TECHNICAL FIELD

This disclosure relates to computer systems and methods and, more particularly, to methods and systems for managing, providing, or allowing searching or retrieval of web services, often using unstructured queries.

BACKGROUND

Web services often help create compatibility and interoperability among various packaged and customized web applications in a standardized and vendor-neutral manner. Web services may be economical and beneficial when used in an enterprise-level business scenario that combines the functionality of multiple applications into easy-to-use enterprise services. Such a business scenario may require a services-oriented architectural approach. Enterprise services may expose the functionality and data of applications so that they can be accessed by any service user.

Often, these web services may be referenced in a Universal Description, Discovery, and Integration (UDDI) repository. To locate a desired web service, the user determines or guesses particular taxonomies or ontologies used by the web service and the potential values for such taxonomies. For example, version 1 of UDDI supported three built-in standard taxonomies: the NAICS taxonomy of industry codes; the UN/SPSC taxonomy of products & services; and a geographical taxonomy of location codes based on ISO 3166, while version 2 implemented an external validation taxonomy. More generally, taxonomies and ontologies may help capture syntax and semantics of the particular web service. Without these restrictions or requirements, results from the query may be incomplete or fail to include the desired web service.

SUMMARY

The disclosure provides various embodiments of systems and methods for managing and searching web services. In one embodiment, a method comprises receiving a query from a first client for one or more requested web services via a graphical user interface. The method further includes identifying at least one web service stored in a Universal Description, Discovery, and Integration (UDDI) registry based on the query and an index of web service metadata. Information associated with the one or more identified web services is then presented via the graphical user interface.

In another aspect of the disclosure, a method comprises identifying metadata associated with a particular web service and storing at least a portion of the identified metadata in a local service definition repository. At least a portion of the local service definition is then electronically communicated to an index associated with a web service search entity.

The foregoing example method—as well as other disclosed methods—may be computer implementable. Moreover, some or all of these aspects may be further included in respective systems and software for managing and searching web services. The details of these and other aspects and embodiments of the disclosure are set forth in the accompanying drawings and the description below. Features, objects, and advantages of the various embodiments will be apparent from the description, drawings, and claims.

DESCRIPTION OF DRAWINGS

FIG. 1 illustrates an example system for searching web services in accordance with one embodiment of the present disclosure;

FIG. 3 is a flowchart illustrating an example method involving deploying a plurality of web services using the system of FIG. 1;

FIG. 4 is a flowchart illustrating an example method for populating a sub-index, remote index, or other metadata repository using the system of FIG. 2B.

DETAILED DESCRIPTION

Figure 2A:
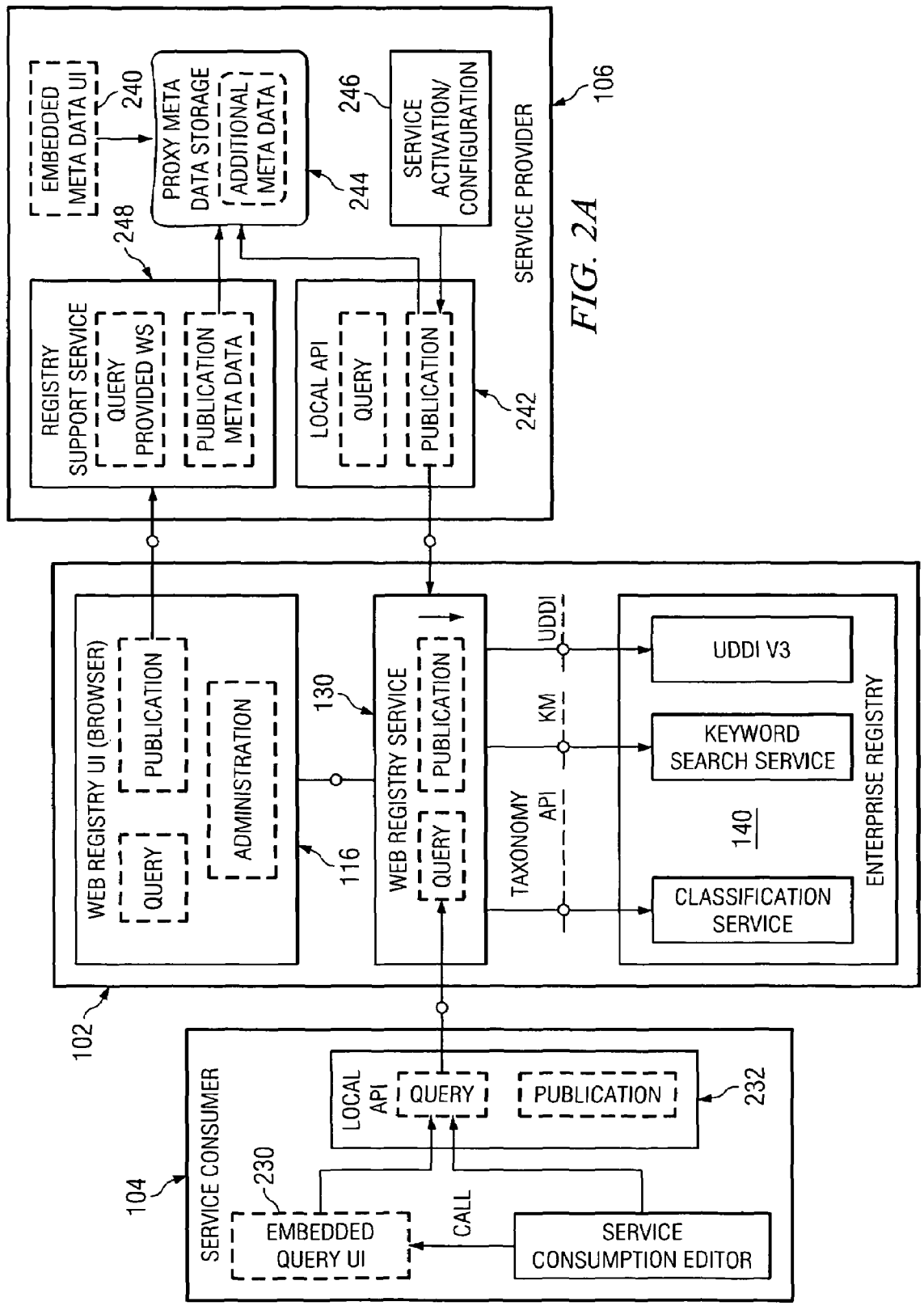
FIGS. 2A-B illustrate more detailed example architectures for searching web services.

FIG. 1 illustrates an example system 100 for managing, providing, or allowing potentially unstructured searching or retrieval of web services 152, which are often described using Web Services Description Language (WSDL). Enterprises or other entities may more easily use web services 152 that can be centered on cross-platform integration. By constructing autonomous capabilities, enterprises can sever interdependencies between systems, applications, and services and target development efforts more effectively at business needs. More specifically, web services 152 may be searched by keyword (or other data or metadata) via a web registry service 130 offered by an Enterprise Registry (ER) provider 102. For example, this ER provider may offer the web registry service 130 as a separate web service or as a search engine or portal. Regardless of the particular implementation, this web registry service 130 includes, references, or utilizes a metadata index 140 that helps create, extend, or enhance searching of one or more Universal Description, Discovery, and Integration (UDDI) or other similar web service registries. Through this web registry service 130, a user need not be technical or knowledgeable of the internal structure of UDDI. Instead, the service may allow the user to provide search criteria in an unstructured way, thereby providing easier and more accurate search results matching the query. For example, the search may utilize prerequisite indexing of relevant meta-information of published web services 152. Common search engines may index various data sources in order to assign this meta-information to the published web services 152. In this case, data sources for technical meta-data (such as port type, stateful vs. stateless) as well as external data stores (such as online help documentation of the particular web service 152) can be indexed and assigned to the web service 152. As a result, the query can provide a combined result list, reflecting information from the assigned or dynamically determined data stores and their respective data sources. The result list can contain a prioritized and sorted list of web services 152, perhaps corresponding to the importance and frequency of the matching query. Further, the web registry service 130 may provide the user with additional actions from the result list, such as "Did you mean" (in case of too few hits), "Best guess" (pick the most suitable one) can be used. Moreover, the web registry service 130 may allow the user to filter the result list according to any suitable parameters including the pre-defined defined data sources (e.g. web services of process component "Time Management"), security settings, user or business profiles, dynamically determined characteristics (location, known platform, etc.), and such.

System 100 is typically a distributed client/server system that spans one or more networks such as 112. As described above, rather than being delivered as packaged software, system 100 may represent a hosted solution that is developed or implemented by a first entity, while some or all of the web services 152 are developed by a second entity. Moreover, the processes or activities of the hosted solution may be distributed amongst these entities and their respective components. In such embodiments, data may be communicated or stored in an encrypted format such as, for example, using the TNG encryption algorithm. This encrypted communication may be between the user and the host or amongst various components of the host. But system 100 may be in a dedicated enterprise environment—across a local area network or subnet—or any other suitable environment without departing from the scope of this disclosure.

Turning to the illustrated embodiment, system 100 includes or is communicably coupled with ER provider 102, one or more clients 104, and one or more web service providers 106, at least some of which communicate across network 112. ER provider 102 may be any entity—including a person, group, organization, government agency, or enterprise—that provides some metadata index 140 that helps clients 104 locate or search on one or more web services 152 without necessarily using UDDI parameters. In fact, while various components and modules may be referred to as enterprise components or modules, it will be understood that this is for example purposes only and these components and modules may be implemented, requested, or executed by any suitable entity. Provider 102 typically includes some computer device such as a server (hereinafter referred to as server 102). Server 102 comprises an electronic computing device operable to receive, transmit, process and store data associated with system 100. For example, server 102 may be a Java 2 Platform, Enterprise Edition (J2EE)-compliant application server that includes Java technologies such as Enterprise JavaBeans (EJB), J2EE Connector Architecture (JCA), Java Messaging Service (JMS), Java Naming and Directory Interface (JNDI), and Java Database Connectivity (JDBC). But, more generally, FIG. 1 provides merely one example of computers that may be used with the disclosure. Each computer is generally intended to encompass any suitable processing device. For example, although FIG. 1 illustrates one server 102 that may be used with the disclosure, system 100 can be implemented using computers other than servers, as well as a server pool. Indeed, server 102 may be any computer or processing device such as, for example, a blade server, general-purpose personal computer (PC), Macintosh, workstation, Unix-based computer, or any other suitable device. In other words, the present disclosure contemplates computers other than general purpose computers as well as computers without conventional operating systems. Server 102 may be adapted to execute any operating system including Linux, UNIX, Windows Server, or any other suitable operating system. According to one embodiment, server 102 may also include or be communicably coupled with a web server that allows users to access various web or network functionality and/or a mail server.

Server 102 is also communicably coupled, directly or indirectly, with one or more web service providers 106. As described above, these providers 106 may be local or remote to server 102 (and may be owned or operated by the same entity) so long as they have one or more web services 152 deployed and operable to be searched. Web service 152 is operable to receive, decode, and respond to client requests. In general, a web service is a web-based application or software that interacts with other web applications via network 112 using open standards, i.e., publicly available standards. More specifically, each web service 152 may be a self-contained, modularized, executable entity (or a component exposed as a web service, such as Java components, remote function call (RFC) modules, and IDocs) that can be published, searched for, and accessed across network 112. For example, Simple Object Access Protocol (SOAP) and XML are current communication standards used in most web services. SOAP is a messaging protocol based on XML for accessing and promoting services on the World Wide Web. SOAP messages may be independent of operating systems used by system 100 and may be transmitted using a variety of Internet protocols, including Simple Mail Transfer Protocol (SMTP), Multipurpose Internet Mail Extensions (MIME), Hyper Text Transfer Protocol (HTTP), or any other suitable protocol. Though, web services 152 employing SOAP do not provide web pages over network 112 but instead share business logic, data, and processes through a programmatic interface across network 112. Regardless of the format, these web services 152 often include one or more web methods that perform a particular set of functionality.

Web services 152 are often deployed to users via an HTTP handler. This handler often uses a virtual URL that allows other users or clients 104 to access the particular web service 152. But, of course, providers 106 may use any other suitable method for web service deployment. For instance, the web services 152 may be provided through a framework used to describe web services interfaces in a UDDI repository. Business process management coordinates the activities of web services provided by business partners to manage processes across applications. In addition, web registry service 130 may support the WS-I Basic Profile, WSI-I Sample Applications, and WS-Security activities. In another implementation, providers 106 may each deploy one or more web services 152 using any suitable technique. For example, provider 106 may deploy an Internet Information Services (IIS)-based Web Service and generate a virtual root (vroot) on the particular web server running IIS. Then, to configure web service 152, provider 106 may create a configuration file for the particular service 152 and place it in the vroot along with the other files. This configuration file may provide various features such as compilation, security, globalization, and HTTP handler mappings.

Returning to server 102, it often includes or is coupled with memory 120. Memory 120 may include any memory or database module and may take the form of volatile or non-volatile memory including, without limitation, magnetic media, optical media, random access memory (RAM), read-only memory (ROM), removable media, or any other suitable local or remote memory component. Illustrated memory 120 includes ER 140, which includes or references one or more web services 152 (often using a classification service). But memory 120 may also include any other appropriate data such as VPN applications or services, firewall policies, a security or access log, print or other reporting files, .HTML files or templates, data classes or object interfaces, unillustrated software applications or sub-systems, and others.

Illustrated web service metadata index 140 is any file, database, or other repository that includes parameters, pointers, variables, instructions, rules, links, or other data for easily providing information associated with or other logical structure of web services 152. For example, metadata index 140 may be a UDDI-based or other enterprise registry that contains or references definitions of web services 152 and associations to their metadata. In some embodiments, metadata index 140 may be formatted, stored, or defined as various data structures in eXtensible Markup Language (XML) documents, text files, Virtual Storage Access Method (VSAM) files, flat files, Btrieve files, comma-separated-value (CSV) files, internal variables, one or more libraries, or any other format capable of storing or presenting web services 152 and their respective web methods in an efficient or user friendly manner.

Server 102 also includes processor 125. Processor 125 executes instructions and manipulates data to perform the operations of server 102 such as, for example, a central processing unit (CPU), a blade, an application specific integrated circuit (ASIC), or a field-programmable gate array (FPGA). Although FIG. 1 illustrates a single processor 125 in server 102, multiple processors 125 may be used according to particular needs and reference to processor 125 is meant to include multiple processors 125 where applicable. In the illustrated embodiment, processor 125 executes web registry service 130.

At a high level, the web registry service 130 is operable to receive and/or process requests from users and present at least a subset of the results to the particular user via some interface. More specifically, web registry service 130 is any application, program, module, process, web service, or other software that helps in the management and searching of web services 152. For example, web registry service 130 may be a web service that is callable (or invokable) from any suitable website or software application. In another example, web registry service 130 may be a search engine or browser plug-in that allows the user to query metadata index 140 from nearly anywhere in world. In a further example, the web registry service 130 may be a remote procedure called from a composite application with any number of portions that may be implemented as Enterprise Java Beans (EJBs) or with run-time implementations in different platforms, such as J2EE, ABAP (Advanced Business Application Programming) objects, or Microsoft's .NET. In yet another example, web registry service 130 may instead present located web services 152 to users via an HTTP handler. This handler often uses a virtual URL that allows other users or clients 104 to access the particular web service 152.

Figure 2B:
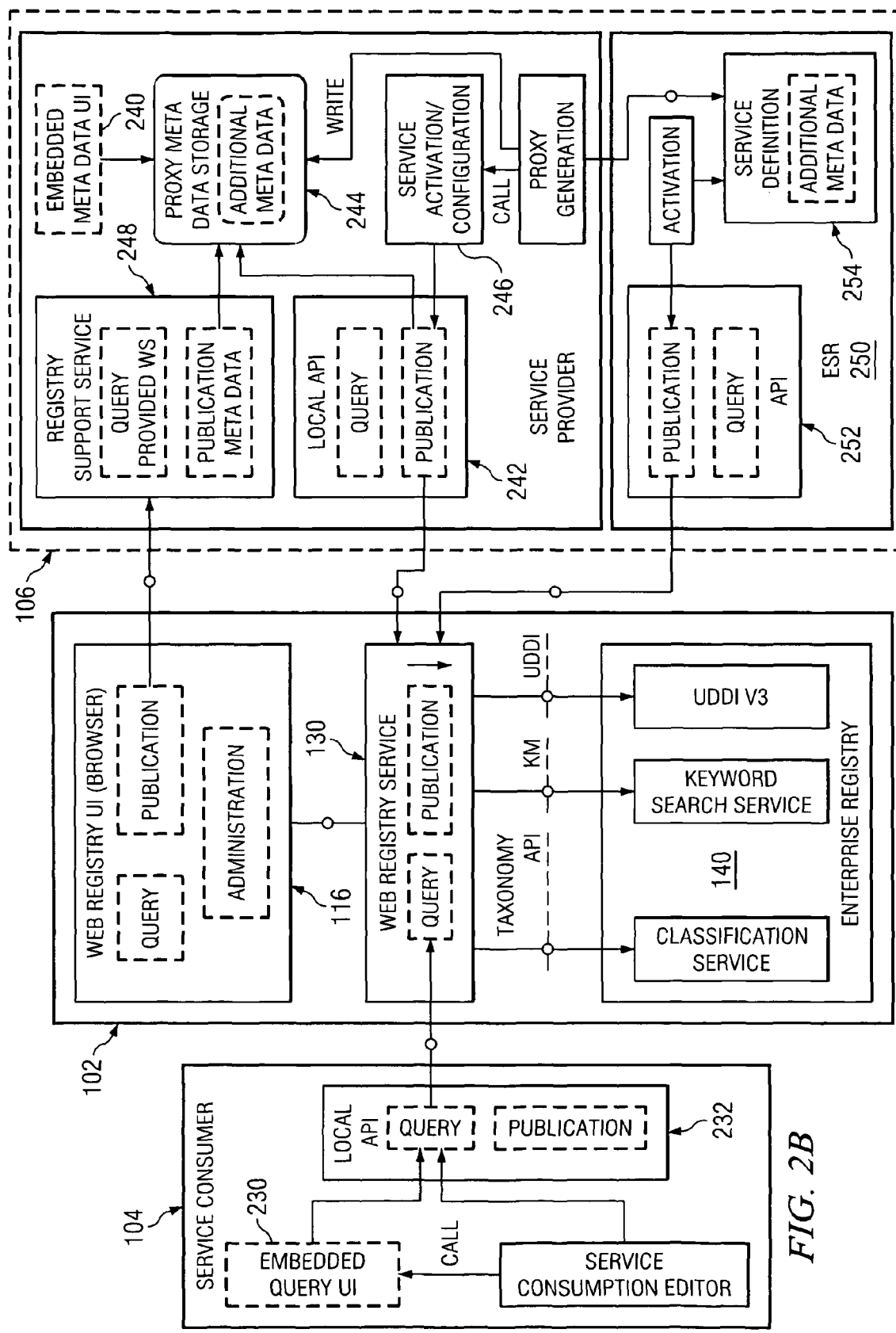

Regardless of the particular implementation, "software" may include software, firmware, wired or programmed hardware, or any combination thereof as appropriate. Indeed, web registry service 130 may be written or described in any appropriate computer language including C, C++, Java, J#, Visual Basic, assembler, Perl, any suitable version of 4GL, as well as others. It will be understood that while web registry service 130 is illustrated in FIG. 1 as a single module that implements the various features and functionality through various objects, methods, or other processes, it may instead include a number of sub-modules, third party services respectively, libraries, and such as illustrated in FIGS. 2A-B. Further, while illustrated as internal to server 102, one or more processes associated with web registry service 130 may be stored, referenced, or executed remotely. For example, a portion of web registry service 130 may be a web service that is remotely called, while another portion of web registry service 130 may be an interface object bundled for processing at remote client 104. Moreover, web registry service 130 may be a child or sub-module of another software module or enterprise application (not illustrated) without departing from the scope of this disclosure.

Server 102 may also include interface 117 for communicating with other computer systems, such as clients 104, over network 112 in a client-server or other distributed environment. In certain embodiments, server 102 receives data from internal or external senders through interface 117 for storage in memory 120 and/or processing by processor 125. Generally, interface 117 comprises logic encoded in software and/or hardware in a suitable combination and operable to communicate with network 112. More specifically, interface 117 may comprise software supporting one or more communications protocols associated with communications network 112 or hardware operable to communicate physical signals. Interface 117 may allow communications across network 112 via a virtual private network (VPN), SSH (Secure Shell) tunnel, or other secure network connection.

Network 112 facilitates wireless or wireline communication between computer server 102 and any other local or remote computer, such as clients 104. Network 112 may be all or a portion of an enterprise or secured network. In another example, network 112 may be a VPN merely between server 102 and client 104 across wireline or wireless link. Such an example wireless link may be via 802.11a, 802.11b, 802.11g, 802.20, WiMax, and many others. While illustrated as a single or continuous network, network 112 may be logically divided into various sub-nets or virtual networks without departing from the scope of this disclosure, so long as at least portion of network 112 may facilitate communications between server 102 and at least one client 104. In other words, network 112 encompasses any internal or external network, networks, sub-network, or combination thereof operable to facilitate communications between various computing components in system 100. Network 112 may communicate, for example, Internet Protocol (IP) packets, Frame Relay frames, Asynchronous Transfer Mode (ATM) cells, voice, video, data, and other suitable information between network addresses. Network 112 may include one or more local area networks (LANs), radio access networks (RANs), metropolitan area networks (MANs), wide area networks (WANs), all or a portion of the global computer network known as the Internet, and/or any other communication system or systems at one or more locations. In certain embodiments, network 112 may be a secure network associated with the enterprise and certain local or remote clients 104.

Client 104 is any computing device operable to connect or communicate with server 102 or network 112 using any communication link. At a high level, each client 104 includes or executes at least GUI 116 and comprises an electronic computing device operable to receive, transmit, process and store any appropriate data associated with system 100. It will be understood that there may be any number of clients 104 communicably coupled to server 102. Further, "client 104," "developer," and "user" may be used interchangeably as appropriate without departing from the scope of this disclosure. Moreover, for ease of illustration, each client 104 is described in terms of being used by one user. But this disclosure contemplates that many users may use one computer or that one user may use multiple computers. As used in this disclosure, client 104 is intended to encompass a personal computer, touch screen terminal, workstation, network computer, kiosk, wireless data port, smart phone, personal data assistant (PDA), one or more processors within these or other devices, or any other suitable processing device. For example, client 104 may be a PDA operable to wirelessly connect with external or unsecured network. In another example, client 104 may comprise a laptop that includes an input device, such as a keypad, touch screen, mouse, or other device that can accept information, and an output device that conveys information associated with the operation of server 102 or clients 104, including digital data, visual information, or GUI 116. Both the input device and output device may include fixed or removable storage media such as a magnetic computer disk, CD-ROM, or other suitable media to both receive input from and provide output to users of clients 104 through the display, namely the client portion of GUI or application interface 116.

GUI 116 comprises a graphical user interface operable to allow the user of client 104 to interface with at least a portion of system 100 for any suitable purpose, such as viewing application or other transaction data. Generally, GUI 116 provides the particular user with an efficient and user-friendly presentation of data provided by or communicated within system 100. In certain cases, GUI 116 may facilitate the indexing of the service attributes and maintained taxonomies, including remotely linked information sources like documentation. As shown later, GUI 116 may comprise a plurality of customizable frames or views having interactive fields, pull-down lists, and buttons operated by the user. For example, GUI 116 may present a generic, standard, or propriety browser operable to manage and/or search web services 152. In another example, GUI 116 may be a portal that allows users to view, create, and manage enterprise services and generate or view historical and real-time reports. Of course, reports may be in any appropriate output format including PDF, HTML, and printable text. In yet another example, GUI 116 may be a front-end to a particular application, or embedded or integrated therein. Indeed, reference to GUI 116 may indicate a reference to the front-end or a component of web registry service 130, as well as the particular interface accessible via client 104, as appropriate, without departing from the scope of this disclosure. It should be understood that the term graphical user interface may be used in the singular or in the plural to describe one or more graphical user interfaces and each of the displays of a particular graphical user interface. Therefore, GUI 116 contemplates any graphical user interface, such as a generic web browser or touchscreen, that processes information in system 100 and efficiently presents the results to the user. Server 102 can accept data from client 104 via the web browser (e.g., Microsoft Internet Explorer or Netscape Navigator) and return the appropriate HTML or XML responses to the browser using network 112.

FIG. 2 illustrate more detailed example architectures for searching web services. For example, FIG. 2A illustrates one modular architecture for an Enterprise Registry provider 102 to provide easy searching of web services 152 to a consumer 104, often using web registry service 130. In this example, ER provider 102 implements a web registry service 130 that includes a query sub-module and a publication sub-module. This web registry service 130 is communicably coupled with various repositories or logical categorizations within metadata index 140 (or enterprise registry), such as a classification service, a keyword search service, and UDDI (perhaps version 3). ER provider 102 may provide an interface or other remote access to this various functionality including publication, query, and administration. This functionality allows various users, such as web service provider 106, consumer 104, and a network or system administrator to utilize authorized services and repositories, including web registry service 130 and the enterprise registry 140. Accordingly, many of the users might execute (knowingly or not) more local APIs, such as 232 and 242, that convert, supplement, support, or otherwise communicate data to server 102. Backends often use a local API that fits into the respective runtime environment (ABAP/Java) and that calls web registry service 130 (or an appropriate sub-module) to access the index 140. Typically, these APIs are linked or communicably coupled with various services, process, modules, or other relatively local software such as i) an embedded query UI 230 or service consumption editor in the case of consumer 104; and ii) registry support service 248, embedded metadata UI 240, proxy metadata or other local web service storage 244, and service activation/configuration 246 in the case of an associated or partnered web service provider 106. Each service definition may be published automatically (such as if it is marked as relevant) or manually by the publication UI. In the case of automatic registration, the service definitions may be registered during deploy-time and the service endpoints may be registered during configuration-time.

As shown in FIG. 2B, web registry service 130 may utilize additional metadata containing the classification data associated with the web services 152. The metadata can be stored in the backends as an extension to the already existing inbound proxy relevant metadata. This additional metadata may be maintained using a user interface embedded into the ABAP and Java IDE, the metadata may be filled during proxy-generation from ESR (Enterprise Service Repository) 244, or using any other suitable technique. This ESR 244 often acts as a repository for maintaining service definitions during development-time or otherwise stores the additional or local metadata. While not illustrated, the ESR can also be present at the consumer or customer 104 landscape. In this situation, the ESR service definitions can be published in addition to the ones of the provider systems. A reference between the provider system service definition and service definition may also be kept. In addition, the association of additional taxonomies (i.e. customer-defined) may also be possible after shipping/registration, by usage of the publication UI, which may provide the standard UDDI features and will be extended by special support for provider-specific taxonomies/categories. The added classification data per service definition may be persisted in UDDI and non-transportable.

It will be understood that while the preceding architectures describe various configurations of web registry service 130 and other software (such as index 140, UI plug-ins, and so forth), they may instead be a standalone or (relatively) simple software program integrated with other distributed modules or functionality. Moreover, each software component may locally include or be remotely linked with some or all of the illustrated components, as well as others not illustrated. In other words, regardless of the particular hardware or software architecture used, web registry service 130 is generally capable of allowing multiple users from one or more entities to search, deploy, discover, or otherwise manage web services 152 to, for example, execute various business processes and techniques. The following descriptions of flowcharts focus on the operation of web registry service 130 (or one of its components, sub-modules, or associated software) in performing one of the respective methods or processes. But system 100 contemplates using any appropriate combination and arrangement of logical elements implementing some or all of the described functionality.

FIG. 3 is a flowchart illustrating an example method 300 involving searching web services 152 using web service metadata index 140. Illustrated method 300 begins at step 302, where ER provider 102 receives a request for web registry service 130. For example, this request may be a request for a web page via web server 102. In another example, this request may be a request for a web service that may be utilized within an application, web page, or other system of the requester 104 or an entity associated therewith (such as a customer or partner of the requester). In response to, and perhaps based on, the request, server 102 invokes or executes web registry service 130 at step 304. For example, server 102 may analyze the request to determine if client 104 requested a web service, a web page, or other such embodiment of web registry service 130. In another example, server 102 may automatically analyze client 104 to determine the better, more efficient, or more appropriate response. Regardless of the particular response, client 104 is typically presented with a GUI 116 that allows the user to select a basic search or an advanced search (such as that shown in FIG. 5A). In one implementation, the basic search may allow the user to input Boolean, natural language, or other search criteria. In another, the user may be able to select from a few of the more common input fields such as name, local vs. remote, and so forth. The advanced search may allow the user to provide more parameters to help limit or focus his search. For example, the user may be able to provide keywords that must be present, words that must not be present, and many others. In another embodiment, web registry service 130 may be called from an application executing on client 104. This application may automatically supply search parameters or other runtime variables, pass through the user's input, or otherwise provide information as appropriate without the knowledge of or hidden from the user. At any rate, web registry service 130 receives a query (potentially unstructured) at step 306 whether it is supplied by the user, by software running or communicating via client 104, or some combination thereof.

Once the query is received, web registry service 130 may parse the query as shown at step 308. This parsing may include identification of various data within the query, analysis of one or more profiles associated with client 104, determination of runtime parameters such as IP address, partnership status, requesting application, security or access settings, and many others as appropriate. Moreover, this query may be parsed in such as way as to make subsequent processing more efficient or cost effective. For example, as illustrated at example step 310, web registry service 130 may determine an appropriate metadata index 140 based on local/remote status of web services 152, location of client 104, or other of the dynamic or static parameters. But, of course, there may be only one index 140 that references or directs the request to child or distributed indices. Once the appropriate metadata index 140 is identified, web registry service 130 accesses the index 140 to identify web services 152 that satisfy the query using any suitable technique, such as SQL-like query, OODB-like processing, and so forth. If there are one or more filter settings for the particular requester, his company or entity, role, or other associated characteristic (as shown at decisional step 314), then web registry service 130 filters the identified web services 152 according to such settings at step 316. For example, the user may be an end user that would not care to see more technical results. In another example, the user may be running the query from a known Accounts Payable application, so web registry service 130 may automatically filter Order Entry web services 152. In a further example, web registry service 130 may determine that the user (or his company) has already invoked, is the developer of, or has a local copy of a particular web service 152. In this case, the particular web service 152 would be filtered from any results.

If there are any web services 152 that satisfy the results (and have not been filtered) at decisional step 318, then the first identified web service 152 is then identified at step 320. If the selected web service is not local (or its metadata not stored in a local repository) at decisional step 322, then web registry service 130 determines the logical location of the web service 152 and/or its provider 106 at step 324 and requests or retrieves any additional information from the respective provider 106 at step 326. For example, this logical location may include an IP address, an absolute or relative network address or Uniform Resource Locator (URL), a customer or partner identifier, a sub-index locator, or any other suitable information that would help locate remote or distributed web services 152 or their metadata. If the metadata index 140 indicates that additional material or documentation is associated with the particular web service 152 (and is accessible by the requester) at decisional step 328, then web registry service 130 identifies the logical location of these materials at step 332. Once the particular web service 152 has been suitably processed, then web registry service 130 adds 1 to a web service counter at step 332 and, if there are more identified web services 152 at step 334, selects the next identified web service 152 at step 336, after which processing returns to step 322.

Once all of the web services 152 that satisfy the query have been identified and suitably processed, then web registry service 130 may sort the collected metadata at step 338. For example, web registry service 130 may sort, rank, or make conspicuous (such as bolded) based on a preferred provider or service, contractual obligations, popularity, name, priority, security settings, known applications, local/remote, or any other criteria. Next, at step 340, the user normally gets a clear, easy to understand list of the different web services 152 that matched that search. Simply, the user should be able to find the appropriate items from that list, if any. The results may allow the user to view the metadata or accompanying information to understand the service's business scenarios, look and feel, as well as basic technical requirements or recommendations. Also, the search results may include the community rating and reviews regarding a specific web service 152 and different layouts of the result list, each result displaying information with different look and feel. In some cases, the search results may also display "big name" customers or case histories for appropriate web services 152. At this point, the user may also refine the current search by conducting another search on the items that are presented in the result list. If the example web service counter is less than some static or dynamic threshold value at decisional step 340 (or if there where no web services that satisfied the current query at step 318), then web registry service 130 may determine one or more variations of the current query. For example, web registry service 130 may automatically determine that the search included a typo and present the modified query to the user for approval. In another example, web registry service 130 may automatically run similar, but more popular, searches to the current query.

FIG. 4 is a flowchart illustrating an example method 400 for populating a sub-index, remote index 140, or other metadata repository 250 using the system of FIG. 2B. Generally, method 400 describes web service provider 106 storing service definitions and associated metadata as the web service 152 is being published or the metadata is being filled during proxy-generation. For example, illustrated method 400 begins at step 402, where a web service 152—relatively local to the particular web service provider 106—is identified. This identification may occur during development, at publication, or at another suitable time. Next, web service provider 106 invokes proxy generation at step 404. At this point, the service definition, the service 152's metadata, or other web service information is stored in the local repository 250 at step 406. At step 408, web service provider 106 executes the service activation 246. Concurrently or after this activation, web service provider 106 transmits at least some metadata to a web service search entity (such as ER provider 102) at step 410. Based on this transmission, the particular web service 152 is then registered with the web service search entity at step 412. While not illustrated, this registration (and its accompanying metadata) may be automatically communicated to other web service search entities upon request or in broadcast form.

Figure 5A:
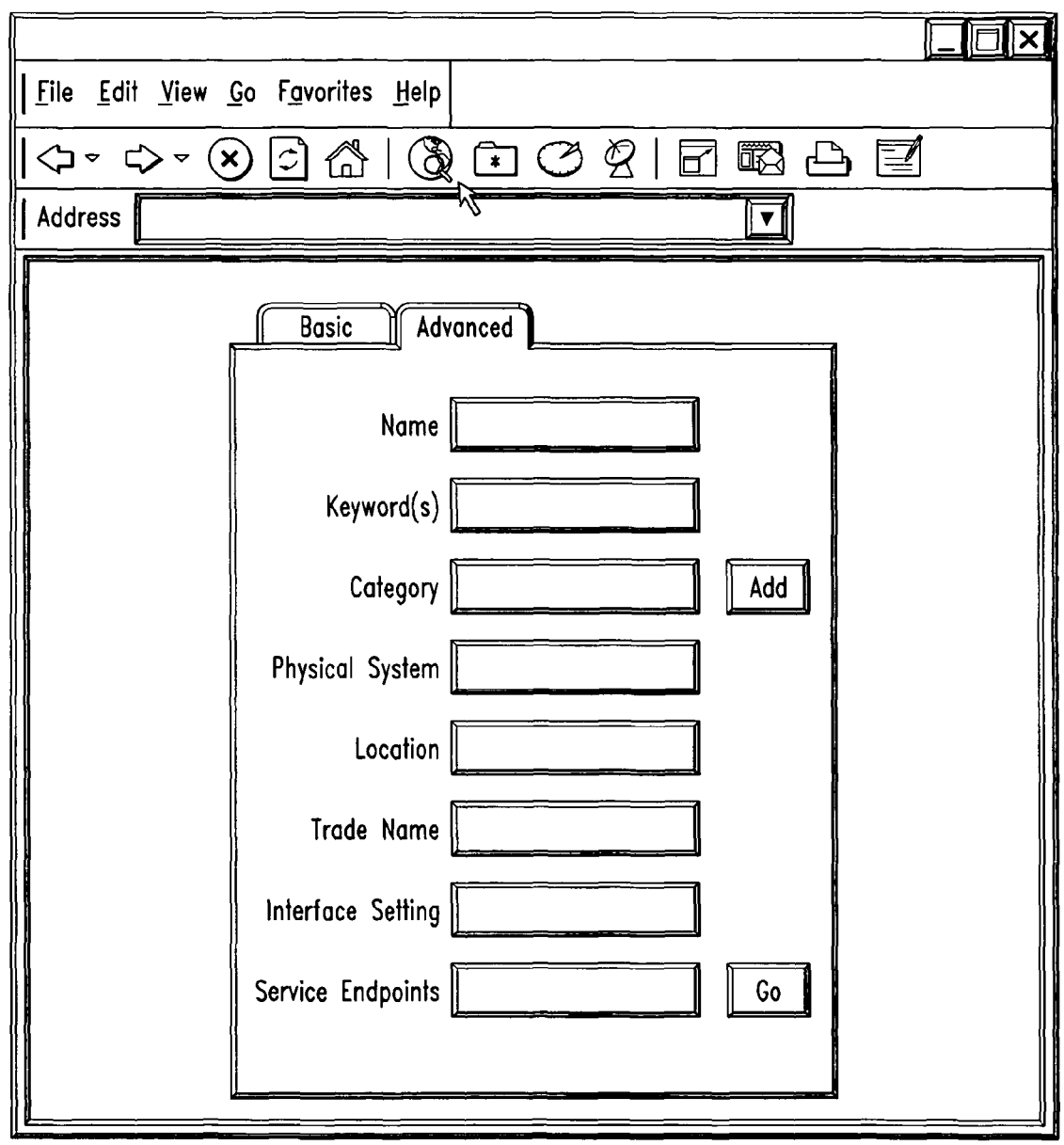
FIGS. 5A-B illustrate example graphical user interfaces (GUIs) for searching and for presenting web service search results as implemented by the application described in FIG. 1.

FIG. 5A illustrates an example search interface 116. In this example, the searching functionality is presented on client 104 via a web browser. GUI 116 shows two selectable tabs:

Basic and Advanced. The basic search provides the user easy searching using the more common web service characteristics. For instance, the basic search may allow the user to search by Service Definition Name or by Keywords. When appropriate, GUI 116 can determine if key word searching is supported by executing a isKeywordSearchSupported( ) or other similar method. In the Name field, the user may input a pattern including wildcards such as "*" and "?." If the user hasn't specified any name, * may be default.

The "Advanced Search" area helps the user to add, select, or input more search criteria such as, for example, categories, physical system, technical or trade name (e.g. Service Definition Name instead of PortType QName), Interface Settings (e.g. Stateful/Stateless), logical locations (such as an absolute or relative network path), or for Service Definitions with available Service Endpoints. In order to add a new category for search, the user may be able press an "Add Category" button, which then opens a popup allowing the user to choose a specific category or category group. In order to display a list of available categories/category groups, the UI may retrieve them by invoking a getAllERClassificationSystems( ) or other similar method. Based on the classification system type a different view shall be displayed for displaying the values. The values of the selected classification system may be retrieved via a getERClassificationSystem( ) or other similar method. In case the classification system is a group, the view is generated automatically. In case the group represents a hierarchy also, the values within the child classification systems depend on the selected parent, i.e. not all values should be displayed of a classification system but only the ones that are relevant based on the hierarchy information. The value-help for all systems in the landscape that provide service definitions can be retrieved via the getPhysicalSystems( ) method.

Figure 5B:
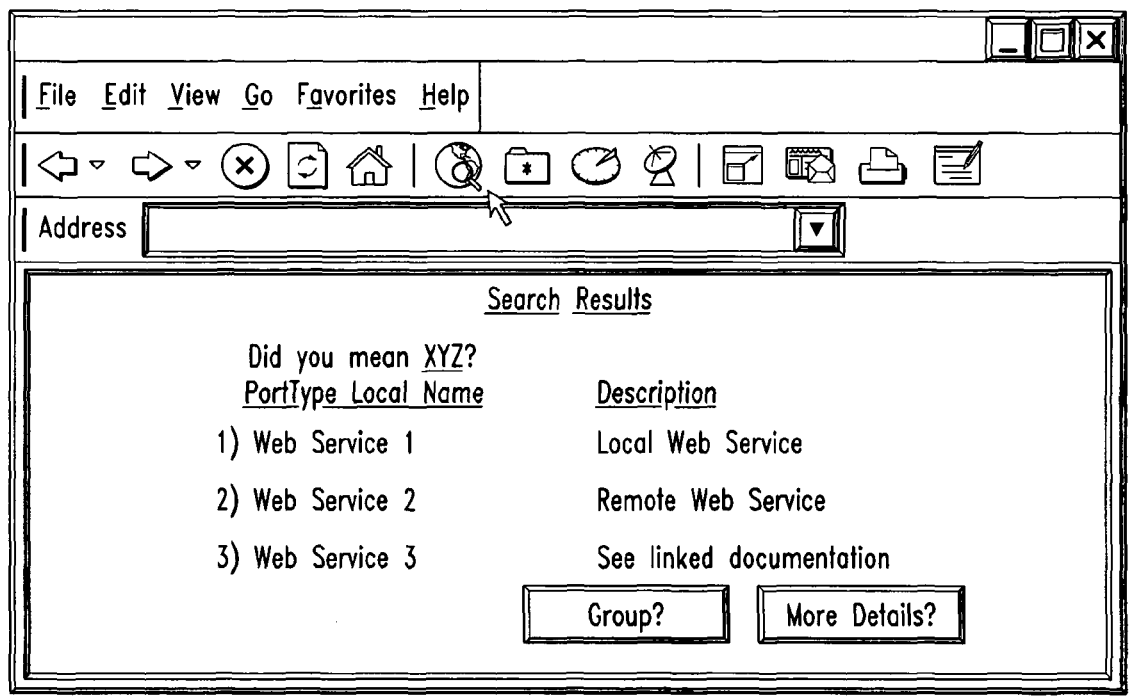

Once the user presses the "Go" button, the search is performed (or requested) and the result list is created, updated, or otherwise presented to the user or client 104 such as example GUI 116 in FIG. 5B. The search can be performed via the findServiceDefinitionsByName( ), findServiceDefinitionsByKeywords( ), or other similar methods, depending on the user selection. Initially, the result may display limited information such as portType local name and description of the service definition. All other attributes and taxonomies can be displayed on demand. Additionally, it should be possible to group the result list by all the available taxonomies.

The preceding flowcharts and accompanying description illustrate exemplary methods 300-400. System 100 contemplates using or implementing any suitable technique for performing these and other tasks. It will be understood that these methods are for illustration purposes only and that the described or similar techniques may be performed at any appropriate time, including concurrently, individually, or in combination. In addition, many of the steps in these flowcharts may take place simultaneously and/or in different orders than as shown. Moreover, system 100 may use methods with additional steps, fewer steps, and/or different steps, so long as the methods remain appropriate. For example, web registry service 130 may not add 1 to any web service counter (which may not exist), but may instead perform near-immediate or an initial count of web services 152 (or even use some other metric such as popularity) that satisfy the query 152 to determine if further processing should be performed.

Although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer implemented method for searching web services, the computer implemented method performed by one or more processors, the method comprising:
   receiving an unstructured query from a first client for one or more requested web services via a graphical user interface;
   searching an index of metadata associated with a plurality of web services using the unstructured query, wherein the index comprises, for each of the plurality of web services, a reference to a published Web Services Description Language (WSDL) file, a logical location of the web service, and external supporting documentation associated with the web service, wherein at least a portion of the index is automatically populated with metadata defining the plurality of web services prior to the invocation of the one or more requested web services and further wherein at least a portion of the plurality of web services is stored in a Universal Description, Discovery, and Integration (UDDI) registry external to the index;
   identifying one or more web services stored in the UDDI registry in response to the unstructured query;
   comparing a count of the one or more web services identified in response to the unstructured query with a threshold value;
   in response to determining the count is less than the threshold value, automatically identifying a variation of the unstructured query to search the index of metadata for a higher count of identified web services;
   searching the index of metadata using the variation of the unstructured query to identify one or more web services in response to the variation of the unstructured query; and
   presenting information associated with the one or more web services identified in response to the variation of the unstructured query via the graphical user interface, the presented information including at least one reference to the one or more web services identified in response to the variation of the unstructured query and stored in the UDDI registry.

2. The method of claim 1, the unstructured query including at least one wildcard character.

3. The method of claim 1, wherein receiving the unstructured query from the first client for one or more requested web services via a graphical user interface comprises receiving the unstructured query from a registry web service invoked by the graphical user interface.

4. The method of claim 1, the index of web service metadata comprising a reference to a published Web Services Description Language (WSDL) file, a logical location of the web service, and external supporting documentation associated with the web service.

5. The method of claim 1, the graphical user interface operable to present the associated information in a sorted fashion.

6. The method of claim 1 further comprising automatically filtering the identified results to reduce the information presented in the graphical user interface.

7. The method of claim 1, wherein automatically populating at least a portion of the index of web service metadata comprises receiving metadata defining a particular web service when the particular web service is published.

8. The method of claim 7, wherein the publication of the particular web service comprises the publication of a particular version of the web service.

9. The method of claim 1, wherein identifying a variation of the unstructured query comprises:
identifying at least one error in the unstructured query;
generating a modified query based on the unstructured query, the modified query including a correction of the at least one error in the unstructured query; and
presenting the modified query to the first client for approval.

10. The method of claim 1, wherein identifying a variation of the unstructured query is based at least in part on popularity of similar queries.

11. The method of claim 1, wherein the presented information further includes at least one reference to the one or more web services identified in response to the unstructured query.

12. Software for searching web services, the software comprising computer readable instructions embodied on a computer readable storage medium and operable to:
receive an unstructured query from a first client for one or more requested web services via a graphical user interface;
search an index of metadata associated with a plurality of web services using the unstructured query, wherein the index comprises, for each of the plurality of web services, a reference to a published Web Services Description Language (WSDL) file, a logical location of the web service, and external supporting documentation associated with the web service, wherein at least a portion of the index is automatically populated with metadata defining the plurality of web services prior to the invocation of the one or more requested web services and further wherein at least a portion of the plurality of web services is stored in a Universal Description, Discovery, and Integration (UDDI) registry external to the index;
identify one or more web services stored in the UDDI registry in response to the unstructured query according to the search;
compare a count of the one or more web services identified in response to the unstructured query with a threshold value;
in response to determining the count is less than the threshold value, automatically identify a variation of the unstructured query to search the index of metadata for a higher count of identified web services;
search the index of metadata using the variation of the unstructured query to identify one or more web services in response to the variation of the unstructured query; and
present information associated with the one or more web services identified in response to the variation of the unstructured query via the graphical user interface, the presented information including at least one reference to the one or more web services identified in response to the variation of the unstructured query and stored in the UDDI registry.

13. The software of claim 12, the unstructured query including at least one wildcard character.

14. The software of claim 12, wherein receiving the unstructured query from the first client for one or more requested web services via a graphical user interface comprises receiving the unstructured query from a registry web service invoked by the graphical user interface.

15. The software of claim 12, wherein identifying one or more web services in the UDDI registry comprises:
identifying at least one web service referenced in a local UDDI registry; and
identifying at least one web service referenced in a remote UDDI registry.

16. The software of claim 12, the graphical user interface operable to present the associated information in a sorted fashion.

17. The software of claim 12 further operable to automatically filter the identified results to reduce the information presented in the graphical user interface.

18. The software of claim 12, wherein presenting information associated with the one or more web services identified in response to the variation of the unstructured query via the graphical user interface comprises communicating the information to a web browser for formatting and display.

19. The software of claim 12, wherein identifying at least one web service in a UDDI registry comprises:
identifying at least one web service referenced in a first remote UDDI registry; and
identifying at least one web service referenced in a second remote UDDI registry.

20. The software of claim 12, wherein automatically populating at least a portion of the index of web service metadata comprises receiving metadata defining a particular web service when the particular web service is published.

21. The software of claim 20, wherein the publication of the particular web service comprises the publication of a particular version of the web service.

22. The software of claim 12, wherein identifying a variation of the unstructured query comprises:
identifying at least one error in the unstructured query;
generating a modified query based on the unstructured query, the modified query including a correction of the at least one error in the unstructured query; and
presenting the modified query to the first client for approval.

23. The software of claim 12, wherein identifying a variation of the unstructured query is based at least in part on popularity of similar queries.

* * * * *